US010846802B1

(12) United States Patent
Olson

(10) Patent No.: US 10,846,802 B1
(45) Date of Patent: *Nov. 24, 2020

(54) BROWSER EXTENSION FOR CAPTURING VEHICLE INFORMATION FROM WEBPAGE FOR GENERATING INSURANCE RATE QUOTE

(71) Applicant: State Farm Mutual Automobile Insurance Company, Bloomington, IL (US)

(72) Inventor: Jeffery L. Olson, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,388

(22) Filed: Sep. 19, 2019

Related U.S. Application Data

(63) Continuation of application No. 14/839,203, filed on Aug. 28, 2015, now Pat. No. 10,467,703.

(60) Provisional application No. 62/173,766, filed on Jun. 10, 2015.

(51) Int. Cl.
*G06Q 40/08* (2012.01)
(52) U.S. Cl.
CPC .................................. *G06Q 40/08* (2013.01)
(58) Field of Classification Search
CPC ..................................................... G06Q 40/08
See application file for complete search history.

(56) References Cited

U.S. PATENT DOCUMENTS

| 6,785,891 B1* | 8/2004 | Allen | G06F 16/958 |
| | | | 719/313 |
| 8,694,680 B2* | 4/2014 | Wyler | G06F 16/9577 |
| | | | 709/246 |
| 2002/0116228 A1* | 8/2002 | Bauer | G06Q 10/10 |
| | | | 705/4 |
| 2005/0273368 A1* | 12/2005 | Hutten | G06Q 10/10 |
| | | | 705/4 |
| 2006/0129463 A1* | 6/2006 | Zicherman | G06Q 30/02 |
| | | | 705/14.73 |
| 2008/0263037 A1* | 10/2008 | Cai | G06F 16/338 |

(Continued)

*Primary Examiner* — Mike Anderson
*Assistant Examiner* — Dario Bianco
(74) *Attorney, Agent, or Firm* — Faegre Drinker Biddle & Reath LLP

(57) ABSTRACT

A browser extension for facilitating a user of a mobile device obtaining an insurance rate quote for a vehicle (or other property, real or personal) from an insurance provider, wherein vehicle information identifying the vehicle is provided on a webpage. The browser extension searches the webpage for vehicle information identifying one or more vehicles. The user is prompted to select the vehicle(s) for which the insurance rate quote is desired from a list of the vehicles is found on the webpage. The browser extension passes the vehicle information for the selected vehicle to a program application. The program application obtains user information useful for generating the insurance rate quote. Based upon the vehicle information and the user information, the program application generates and displays for the user the insurance rate quote for the vehicle. Additionally, the user may be similarly offered a loan and/or an extended warranty for the vehicle.

20 Claims, 7 Drawing Sheets

(56) References Cited

U.S. PATENT DOCUMENTS

| | | | |
|---|---|---|---|
| 2011/0125724 A1* | 5/2011 | Mo | G06F 16/9535 |
| | | | 707/706 |
| 2013/0080345 A1* | 3/2013 | Rassi | G06Q 30/02 |
| | | | 705/319 |
| 2013/0317860 A1* | 11/2013 | Schumann, Jr. | G06Q 40/08 |
| | | | 705/4 |
| 2014/0122291 A1 | 5/2014 | Sampathkumaran et al. | |
| 2014/0201620 A1* | 7/2014 | Khona | G06F 16/951 |
| | | | 715/234 |
| 2015/0254762 A1* | 9/2015 | Fisher | G06Q 30/08 |
| | | | 705/26.3 |
| 2015/0347617 A1 | 12/2015 | Weinig et al. | |

* cited by examiner

Fig. 7.

Carrier 🛜    1:22 PM

Quote Vehicle

Will the 2014 Ford C-Max Hybrid SE Hatchback with VIN 1FADP5AU6EL502911...

Replace an existing vehicle? >

Be added as a new additional vehicle? >

Fig. 8.

Carrier 🛜    1:22 PM

< Back    Select vehicle to replace

TOYOTA CAMRY 4DR
VIN 1DSHJPFB5TJ998768 >

FORD THUNDERBIRD 2DR
VIN 1A8JAATCSJH998223 >

Fig. 9.

*Carrier* 1:22 PM
Done  State Farm

This quote is based on the policy limits, coverages, and other information on your current State Farm auto policy.

Current Premium
2012 TOYOTA PRIUS

$45.91 /month
with a State Farm Payment Plan $275.48 / 6 months

New Quote
2014 FORD C-MAX HYBRID

$45.41 /month
with a State Farm Payment Plan $272.44 / 6 months

[ Quote A Different Vehicle ]

38

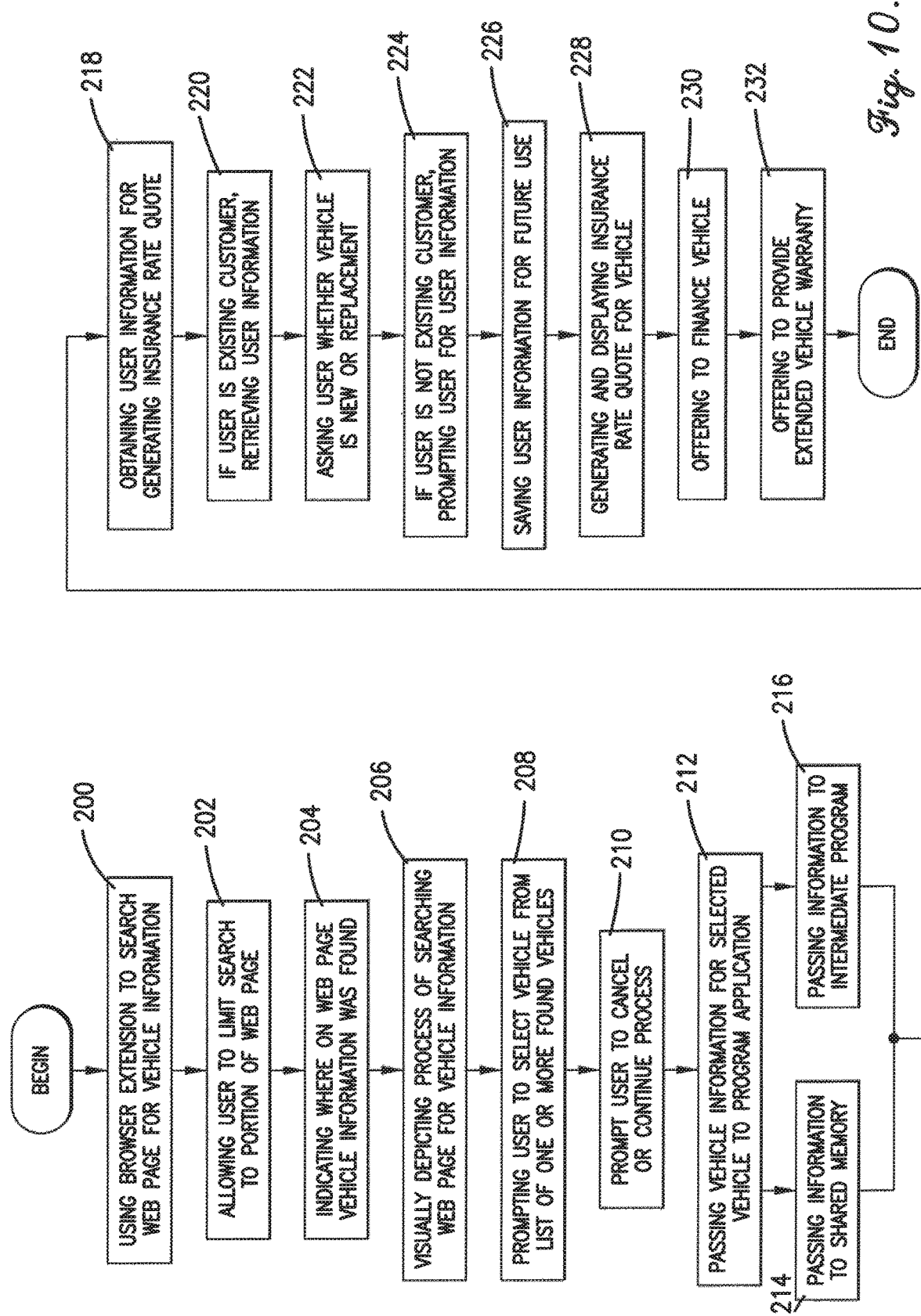

BROWSER EXTENSION FOR CAPTURING VEHICLE INFORMATION FROM WEBPAGE FOR GENERATING INSURANCE RATE QUOTE

RELATED APPLICATIONS

The present application is a continuation of, and claims the benefit of, U.S. patent application Ser. No. 14/839,203, filed Aug. 28, 2015 and entitled "Browser Extension for Capturing Vehicle Information from Webpage for Generating Insurance Rate Quote," which is a non-provisional patent application claiming priority benefit of an earlier-filed U.S. provisional patent application entitled "Browser Extension for Capturing Vehicle Information from Webpage for Generating Insurance Rate Quote," Ser. No. 62/173,766, filed Jun. 10, 2015. The entireties of the identified earlier-filed applications are hereby incorporated by reference in their entireties into the present application.

FIELD

The present disclosure generally relates to generating insurance rate quotes, and, more particularly, to a browser extension for capturing vehicle information from a webpage for use in generating an insurance rate quote.

BACKGROUND

People shopping for vehicles, or otherwise viewing vehicles online, may want to determine the costs of insuring those vehicles. One way to obtain an insurance rate quote is to manually transfer, by typing or copying-and-pasting, information about the vehicle from one webpage that provides the information to another webpage that uses the information to generate the insurance rate quote. This manual process suffers from several disadvantages. One disadvantage is that mistakes may be made in manually transferring the vehicle information, which may result in having to repeat the process or, if the error goes unnoticed, an incorrect insurance rate quote. Another disadvantage is that manually transferring vehicle information for several vehicles may be a time-consuming process. These and other disadvantages may be further exacerbated when using a mobile device.

BRIEF SUMMARY

The present embodiments may relate to, inter alia, a browser extension configured to cooperate with a program application to allow users of mobile devices to quickly and easily obtain insurance rate quotes for vehicles based upon substantially any webpages containing identifying information for the vehicles. More broadly, the browser extension may be configured to allow users of mobile devices to quickly and easily obtain insurance rate quotes for substantially any kind of real or personal properties based upon substantially any webpages containing identifying information for the properties.

In one aspect, a computer system may be provided for facilitating a user of a mobile device obtaining an insurance rate quote for a vehicle from an insurance provider. The vehicle information identifying the vehicle may be provided on a webpage. The computer system may include a communication element configured to receive and transmit communications via a network; a memory element configured to store information; a display configured to display information to the user; and/or a processing element electronically coupled to the communication element and the memory element. The memory element may store and the processing element may execute a browser extension and program application. The browser extension may search the webpage for the vehicle information identifying the vehicle. The user may be prompted to select the vehicle for which the insurance rate quote is desired from a list of one or more vehicles for which vehicle information identifying the one or more vehicles is found on the webpage. The browser extension may automatically pass the vehicle information identifying the vehicle for which the insurance rate quote is desired to the program application. The program application may obtain user information for generating the insurance rate quote. Based upon the vehicle information and the user information, the program application may generate and display for the user the insurance rate quote for the vehicle to facilitate (i) user review and/or approval of the quote and/or (ii) the user purchasing insurance covering the vehicle. The computer system may include additional, fewer, or alternative components or features, including those discussed elsewhere herein.

In another aspect, a computer-implemented method may be provided for facilitating a user of a mobile device obtaining an insurance rate quote for a vehicle from an insurance provider. The vehicle information identifying the vehicle may be provided on a webpage. The browser extension may search the webpage for the vehicle information identifying the vehicle. The user may be prompted to select the vehicle for which the insurance rate quote is desired from a list of one or more vehicles for which vehicle information identifying the one or more vehicles was found on the webpage. The browser extension may automatically pass the vehicle information identifying the vehicle for which the insurance rate quote is desired to a program application. The program application may obtain user information for generating the insurance rate quote. Based upon the vehicle information and the user information, the program application may generate and display for the user the insurance rate quote for the vehicle to facilitate (a) user review and/or approval of the quote and/or (b) the user purchasing insurance covering the vehicle. The computer-implemented method may include additional, fewer, or alternative features, including those discussed elsewhere herein, and/or may be implemented via (i) one or more local or remote processors, such as those associated with mobile devices, wireless communication networks, and/or insurance provider servers, and/or (ii) computer-executable instructions stored on non-transitory computer-readable media or medium.

In another aspect, a non-transitory computer-readable medium with an executable program stored thereon may be provided for facilitating a user of a mobile device obtaining an insurance rate quote for a vehicle from an insurance provider. The vehicle information identifying the vehicle may be provided on a webpage. The browser extension may search the webpage for the vehicle information identifying the vehicle. The user may be prompted to select the vehicle for which the insurance rate quote is desired from a list of one or more vehicles for which vehicle information identifying the one or more vehicles is found on the webpage. The browser extension may automatically pass the vehicle information identifying the vehicle for which the insurance rate quote is desired to a program application. The program application may obtain user information for generating the insurance rate quote. Based upon the vehicle information and the user information, the program application may generate and display for the user the insurance rate quote for the vehicle to facilitate (i) user review and/or approval of the quote and/or (ii) the user purchasing insurance covering the vehicle. The non-transitory computer readable medium and the program stored thereon may include instructions for additional, fewer, or alternative features, including those discussed elsewhere herein.

Each of the aforementioned aspects may further include any one or more of the following additional or alternative features. Vehicles for which the insurance rate quote is desired may include cars, trucks, motorcycles, boats, airplanes, personal watercraft, all-terrain vehicles (ATVs), riding lawnmowers, and/or recreational vehicles. Vehicle information identifying the vehicles may include vehicle identification numbers (VINs), makes, models, manufacturing years, colors, engines, current mileage, and/or conditions. Webpages on which the vehicle information may be found may include vehicle dealers' webpage, online marketplace webpages, online bulletin board webpages, and/or newspaper online classified webpages. The user may be allowed to indicate a portion of the webpage in which the vehicle information may be found, and the browser extension's search for the vehicle information may be limited to the indicated portion of the webpage. Where on the webpage the vehicle information was found may be indicated for the user. The browser extension's searching of the webpage for the vehicle information may be visually depicted for the user.

Prior to passing the vehicle information to the program application, the user may be prompted to discontinue the process of obtaining the rate quote and close the browser extension, or to continue the process of obtaining the rate quote and pass the vehicle information to the program application. Passing the vehicle information to the program application may include automatically populating one or more fields in the program application. Passing the vehicle information to the program application may include storing the vehicle information in a memory location which is accessible to both the browser extension and the program application. Passing the vehicle information to the program application may include passing the vehicle information to an intermediate program, closing the browser extension, and/or passing the vehicle information from the intermediate program to the program application.

Obtaining the user information may include, if the user is an existing customer of the insurance provider, retrieving user information from the insurance provider for generating the insurance rate quote, or, if the user is not an existing customer of the insurance provider, prompting the user to provide the user information for generating the insurance rate quote. The user information may include the user's name, age, address, and/or number of driving miles in a particular time period. The user information may be saved for future use by the browser extension or program application. If the user is an existing customer of the insurance provider, the user may be prompted to indicate whether the vehicle for which the insurance rate quote is desired will replace an existing vehicle insured by the user. If so, one or more of the existing vehicles may be listed and the user prompted to select the vehicle to be replaced, or, if not, the user may be prompted to provide an approximate number of miles that the vehicle for which the insurance rate quote is desired will be driven in a particular time period.

If the user selects a plurality of vehicles for which insurance rate quotes are desired, the plurality of insurance rate quotes may be displayed simultaneously to facilitate a comparison of the cost of insuring each vehicle. An offer may be made to finance the user's acquisition of the vehicle for which the insurance rate quote is desired, and, if the user accepts the offer, the vehicle information and the user information may be passed to the same or another program application that generates and displays for the user an interest rate quote. An offer may be made to provide an extended warranty on the vehicle for which the insurance rate quote is desired, and, if the user accepts the offer, the vehicle information and the user information may be passed to the same or another program application that generates and displays for the user an extended warranty price quote.

As mentioned, more broadly, an insurance rate quote may be provided for substantially any form of property, real or personal. More specifically, a computer system, a computer-implemented method, and/or a non-transitory computer medium with an executable program stored thereon may be provided for facilitating a user of a mobile device to obtain an insurance rate quote for a property from an insurance provider. The property information may be provided on a webpage. The browser extension may search the webpage for the property information identifying the property. The user may be prompted to select the property for which the insurance rate quote is desired from a list of one or more properties for which property information identifying the one or more properties is found on the webpage. The browser extension may automatically pass the property information identifying the property for which the insurance rate quote is desired to a program application. The program application may obtain user information for generating the insurance rate quote. Based upon the property information and the user information, the program application may generate and display for the user the insurance rate quote for the property. The property may be real property, such as houses, apartments, and/or land, and the insurance rate quote may include owner's insurance and/or renter's insurance. The property information identifying the real property may include multiple listing services numbers, street addresses, global positioning system coordinates, square footages, roof types, years built, locations, and/or special features. The property may be personal property, such as vehicles, jewelry, and/or artworks. The property information identifying the personal property may include a nature of the property and/or a value of the property.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 7 is a depiction of an exemplary mobile device screen capture showing a fifth action in the operation of the browser extension and program application;

FIG. 8 is a depiction of an exemplary mobile device screen capture showing a sixth action in the operation of the browser extension and program application;

FIG. 9 is a depiction of an exemplary mobile device screen capture showing a seventh action in the operation of the browser extension and program application; and FIG. 10 is a flowchart of exemplary actions performed by embodiments of the browser extension and program application.

The Figures depict preferred embodiments for purposes of illustration only. One skilled in the art will readily recognize from the following discussion that alternative embodiments of the systems and methods illustrated herein may be employed without departing from the principles of the embodiments described herein.

DETAILED DESCRIPTION

Figure 1:
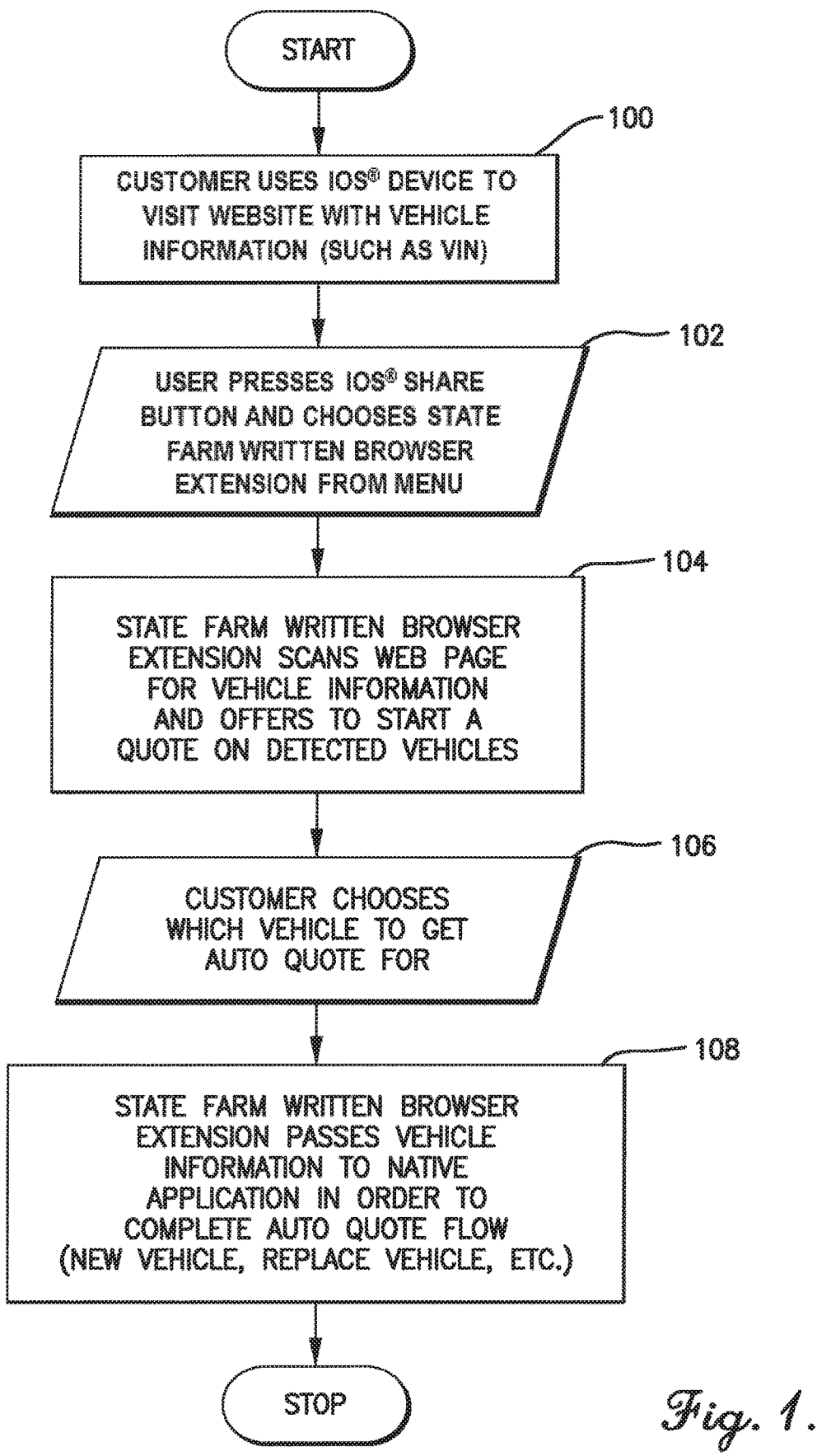
FIG. 1 is an exemplary flowchart of actions associated with using and/or performed by an embodiment of a browser extension and program application.

Referring to FIG. 1, the present embodiments may relate to, inter alia, a browser extension configured to cooperate with a program application to allow users of mobile devices to quickly and easily obtain insurance rate quotes for vehicles based upon substantially any webpages containing identifying information for the vehicles. More broadly, the browser extension may be configured to allow users of mobile devices to quickly and easily obtain insurance rate quotes for substantially any kind of real or personal property based upon substantially any webpages containing identifying information for the property.

In one embodiment, shown in FIG. 1, a user may use a mobile device to visit a webpage containing vehicle identifying information, as shown in step 100. The user may launch a mobile operating system (e.g., iOS) browser extension (i.e., a computer program that extends the functionality of a web browser) to facilitate obtaining an insurance rate quote for a vehicle on the webpage, as shown in step 102. The browser extension may scan the webpage for vehicle information (e.g., vehicle identification number (VIN), make, model, year, color, engine, and/or condition), as shown in step 104. The user may optionally select the vehicle from among one or more found vehicles for which the insurance rate quote is desired, as shown in step 106. This step may be optional. For instance, if there were only information detected or scanned for a single vehicle, the method may generate and provide a quote only for the single vehicle detected without asking the customer to select the vehicle. The browser extension may automatically pass the vehicle information for the selected vehicle to a program application to complete the insurance rate quote flow, which may include, e.g., obtaining user information for generating the insurance rate quote, and which ultimately generates and displays the desired insurance rate quote for the selected vehicle, as shown in step 108. The program application may be an existing application, such as State Farm's Pocket Agent® mobile app, or a new application. Thus, the embodiment eliminates the need for the user to type, copy-and-paste, or otherwise manually transfer the vehicle information to the program application, and thereby may eliminate the risk of information transfer errors, reduce the time required to obtain the rate quote, and/or generally enhance the rate quote experience.

Specific embodiments of the technology will now be described. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense. The scope of the present invention is defined only by the appended claims, along with the full scope of equivalents to which the claims are entitled.

I. Exemplary Computer System

Figure 2:
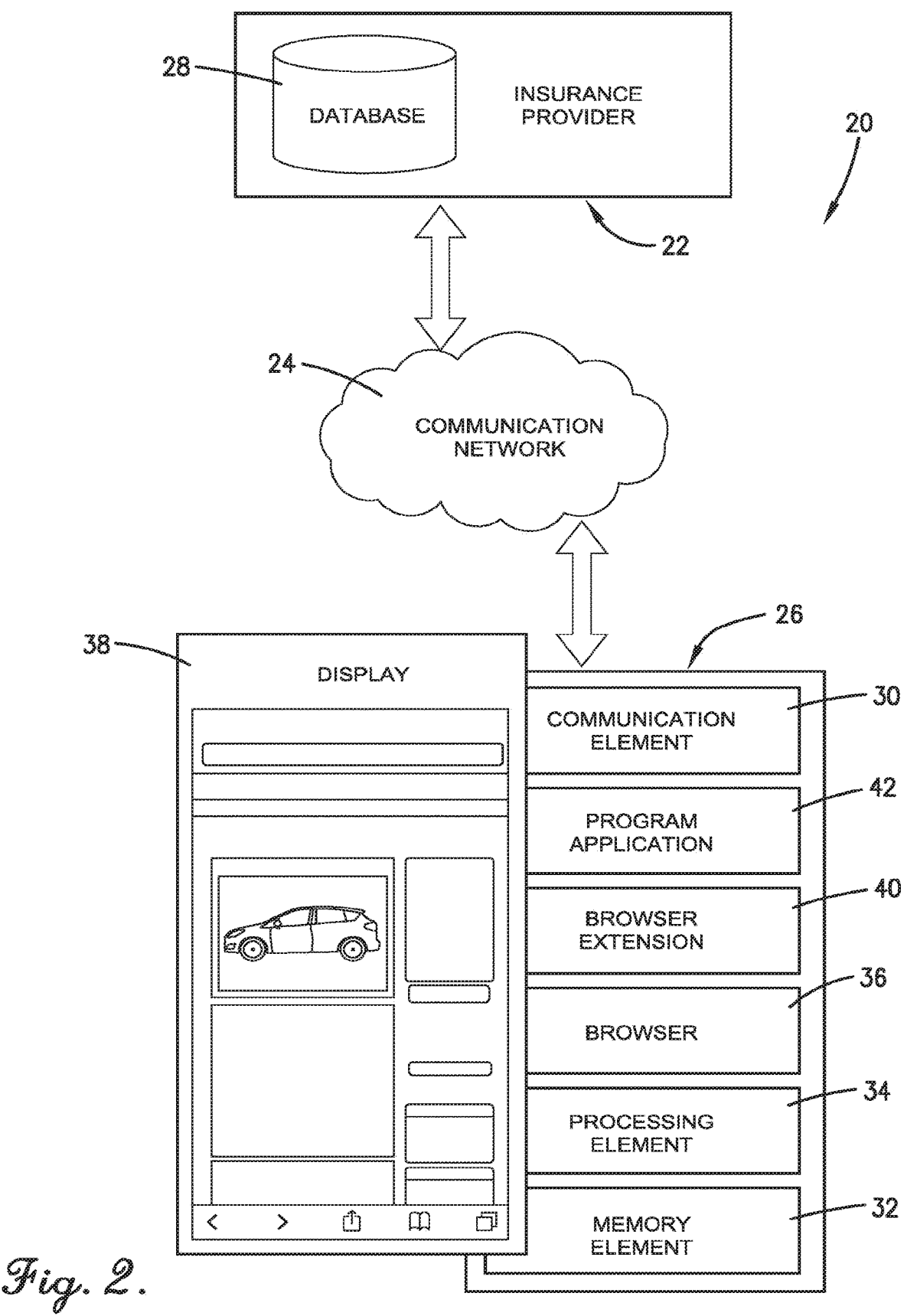
FIG. 2 is an exemplary computer system in which the browser extension and program application may operate.

FIG. 2 depicts an exemplary computing environment for an embodiment of the browser extension configured to cooperate with the program application to allow the user of the mobile device to quickly and easily obtain an insurance rate quote for a vehicle based upon a webpage containing vehicle information identifying the vehicle. A computer system 20 may broadly comprise an insurance provider 22, a communication network 24, and the mobile device 26.

The insurance provider 22 may be substantially any provider of insurance for vehicles (or other forms of property, real or personal), such as State Farm Mutual Automobile Insurance Company. The insurance provider may maintain a database 28 of customer information about existing customers, which may include such information as each customer's name, age, address, driving history, insurance history, number and type of vehicles insured, and/or number of miles each vehicle is driven in a particular time period (e.g., per year, per six months, etc.).

The communication network 24 may be embodied in a local, metro, or wide area network (LAN, MAN, or WAN) and may be formed using a plurality of known architectures and topologies. In some embodiments, a portion of the network 24 may be formed by at least a portion of the Internet, by communication lines that are leased from other entities, or by combinations thereof. The network 24 may be implemented within a small space, such as an office or a building, or across a larger space, such as a city, a region, or a country.

The mobile device 26 may be substantially any suitable mobile device, such as a tablet or smart phone. The mobile device 26 may have various hardware and software components including a communication element 30, a memory element 32, a processing element 34, a browser 36, a display 38, the browser extension 40, and/or the program application 42.

The communication element 30 may generally allow for communication with external systems or devices, including those of the insurance provider 22. The communication element 30 may include signal or data transmitting and receiving circuits, such as antennas, amplifiers, filters, mixers, oscillators, digital signal processors (DSPs), and the like. The communication element 30 may establish communication wirelessly by utilizing radio-frequency (RF) signals and/or data that comply with communication standards such as cellular 2G, 3G, or 4G, IEEE 802.11 standard (such as WiFi), IEEE 802.16 standard (such as WiMAX®, which is a registered trademark of WiMAX Forum, a California corporation), Bluetooth™, or combinations thereof. Alternatively or additionally, the communication element 30 may establish communication through connectors or couplers that receive metal conductor wires or cables which are compatible with networking technologies, such as Ethernet. In certain embodiments, the communication element 30 may also couple with optical fiber cables. The communication element 30 may be electronically coupled or otherwise in electronic communication with the memory element 32 and the processing element 34.

The memory element 32 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 32 may include, or may constitute, a "computer-readable medium." The memory element 32 may store instructions, code, code segments, software, firmware, programs, applications, apps, services, daemons, or the like, including the browser extension 40 and program application 42, that are executed by the processing element 34. The memory element 32 may also store settings, data, documents, sound files, photographs, movies, images, databases, and the like.

The processing element 34 may include one or more processors, microprocessors, microcontrollers, DSPs, field-programmable gate arrays (FPGAs), analog and/or digital application-specific integrated circuits (ASICs), or the like, or combinations thereof. The processing element 34 may generally execute, process, or run instructions, code, code segments, software, firmware, programs, applications, apps, processes, services, daemons, or the like, including the browser extension 40 and the program application 42. The processing element 34 may also include hardware components, such as finite-state machines, sequential and combinational logic, and other electronic circuits that may perform the functions necessary for the operation of embodiments of the current inventive concept. The processing element 34 may be in communication with the other components of the mobile device 26 through serial or parallel links that include address busses, data busses, control lines, and the like.

The browser 36 may be substantially any suitable browser configured to allow the user of the mobile device 26 to view webpages, including webpages on which vehicle information may be found.

The display 38 may be substantially any suitable display configured to visually communicate information to the user of the mobile device 26. The display 38 may be implemented using any appropriate technology and design, such as light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. Furthermore, the display 38 may have substantially suitable shape; may possess a square or a rectangular aspect ratio which may be viewed in either a landscape or a portrait mode; and may further include a lens or other covering overlying all or part of the display 38 and configured to enhance the visibility of the information shown on the display 38.

Figure 4:
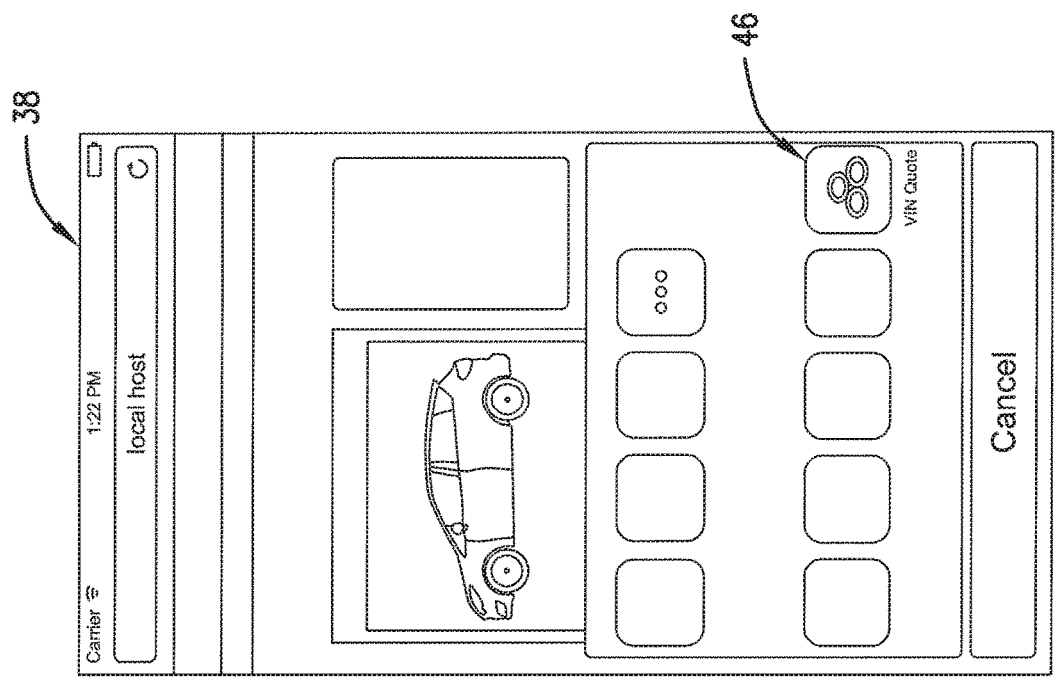
FIG. 4 is a depiction of an exemplary mobile device screen capture showing a second action in the operation of the browser extension and program application.
Figure 3:
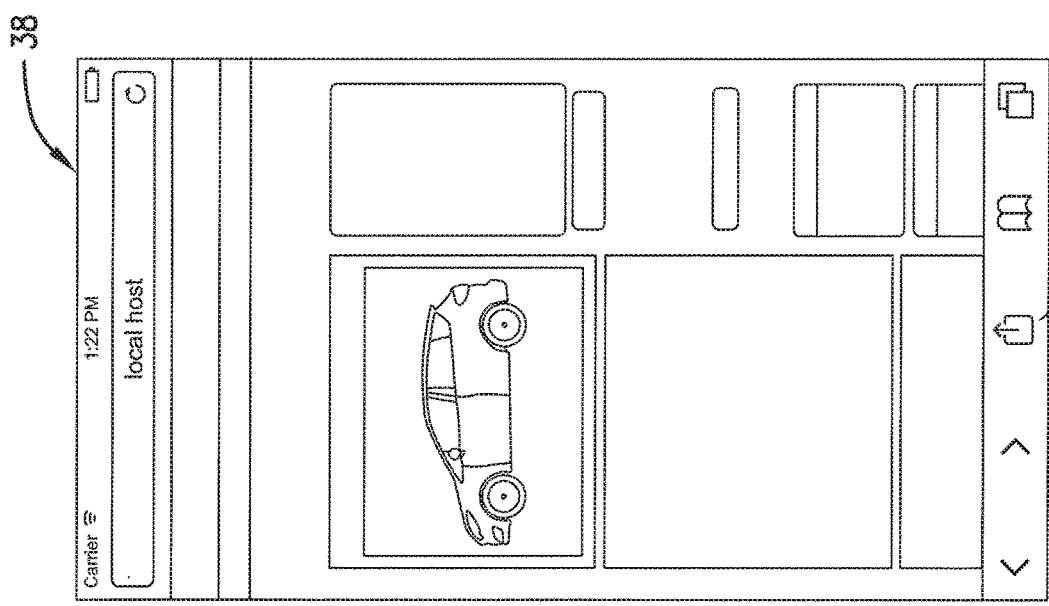
FIG. 3 is a depiction of an exemplary mobile device screen capture showing a first action in the operation of the browser extension and program application.

The browser extension 40 and the program application 42 may be stored in the memory element 32 and executed by the processing element 34 to perform substantially as follows. The user may first launch the browser extension 40. As seen in FIG. 3, this may be accomplished by selecting an iOS "Share Sheet" icon 44 on the display 38, and as seen in FIG. 4, selecting a browser extension icon 46 (here shown as the State Farm logo) on the display 38 to launch the browser extension 40. The user may then view on the display 38 a webpage containing vehicle information identifying one or more vehicles, and the browser extension 40 may substantially automatically scan the webpage for the vehicle information.

Figure 6:
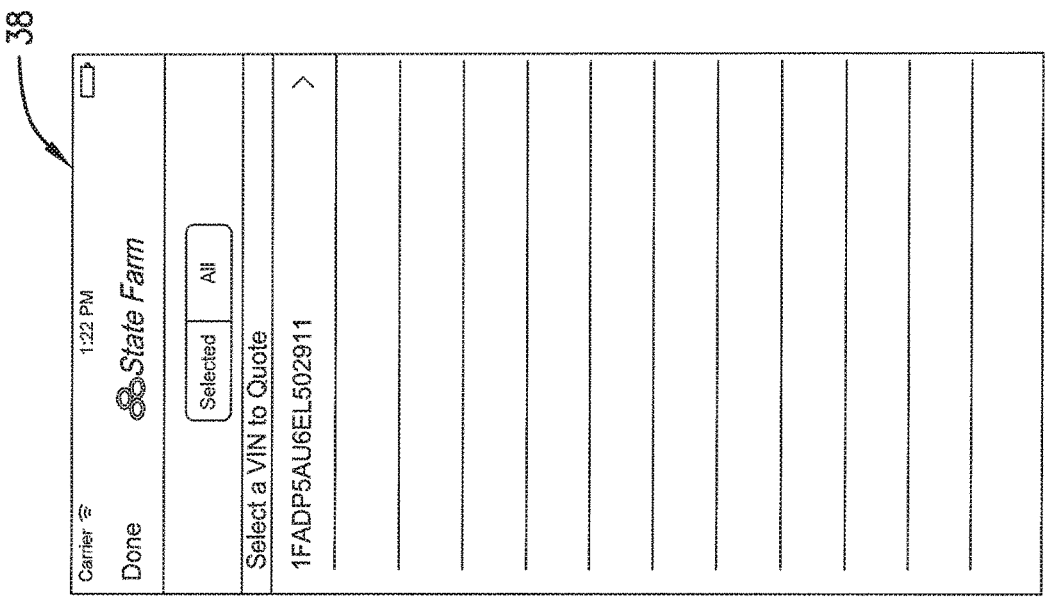
FIG. 6 is a depiction of an exemplary mobile device screen capture showing a fourth action in the operation of the browser extension and program application.
Figure 5:
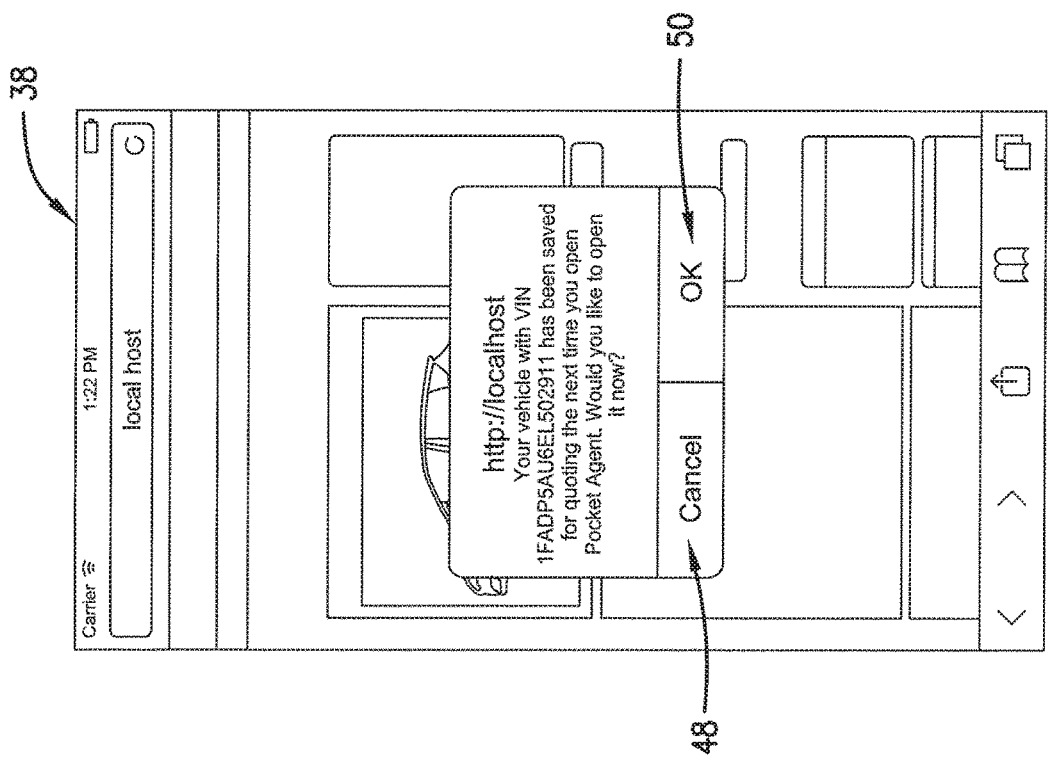
FIG. 5 is a depiction of an exemplary mobile device screen capture showing a third action in the operation of the browser extension and program application.

In one implementation, as seen in FIG. 5, the user may be allowed to select a "cancel" icon 48 or otherwise similarly indicate a desire not to proceed and thereby close the browser extension 40 without obtaining an insurance rate quote, or select an "okay" icon 50 or otherwise indicate a desire to launch the program application 42 and proceed with obtaining a rate quote. As seen in FIG. 6, the user may be prompted to select the vehicle for which a rate quote is desired from among one or more vehicles found on the webpage.

The browser extension 40 may automatically pass the identifying vehicle information for the selected vehicle(s) to the program application 42 in order to continue the insurance rate quote flow. The passed information may pre-populate one or more vehicle information fields in the program application. If the user is already a customer of the insurance provider 22, and is logged in, one or more other fields in the program application 42 may also be pre-populated based upon customer information already in the insurance provider's database 28. For example, as seen in FIG. 7, if the user is already a customer of the insurance provider 22, the application may ask the user whether the selected vehicle is to be added to any vehicles the user already owns or whether the selected vehicle is to replace a vehicle the user already owns, and, if the latter, as seen in FIG. 8, the application may prompt the user to select the existing vehicle which is to be replaced. If the user is not already an existing customer of the insurance provider 22, then the user may be prompted to provide user information which is useful or necessary to generating a rate quote. As seen in FIG. 9, the program application 42 may then present on the mobile device's display 38 the generated insurance rate quote(s) for the selected vehicle(s).

The computer system 20 may include additional, fewer, or alternative components or features, including those discussed elsewhere herein, and particularly the additional features discussed in the section describing the computer-implemented method.

II. Exemplary Computer-Implemented Method

FIG. 10 depicts an exemplary computer-implemented method performed by the browser extension 40 and program application 42. As discussed, the browser extension 40 and the program application 42 may be stored in the memory element 32 and executed by the processing element 34 on the mobile device 26.

The user may launch the browser extension 40, and view on the display 38 a webpage containing vehicle information identifying one or more vehicles. The browser extension 40 may substantially automatically scan the webpage for the vehicle information, as shown in step 200. The vehicle for which the insurance rate quote is desired may be substantially any kind of vehicle, such as a car, a truck, a motorcycle, a boat, an airplane, a personal watercraft, an all-terrain vehicle (ATV), a riding lawnmower, and/or a recreational vehicle. The vehicle information may include one or more of a VIN, a make, a model, manufacturing year, a color, an engine, a condition, mileage or miles, and/or substantially any other information useful or necessary in generating the rate quote. The webpage may be substantially any webpage on which vehicle information may be found, such as a vehicle dealer's webpage, an online marketplace webpage (e.g., eBay, Craigslist, AutoTrader.com), an online bulletin board webpage, and/or a newspaper online classified webpage.

In one implementation, the user may be allowed to highlight or otherwise indicate a portion of the webpage, and the browser extension 40 may limit its search for vehicle information to the highlighted or otherwise indicated portion of the webpage, as shown in step 202. This feature may both reduce the time required for the browser extension 40 to scan for vehicle information and limit the number of vehicles in the presentation from which the user selects the vehicle(s) of interest. In one implementation, the browser extension 40 may allow the user to see from where on the webpage the vehicle information was taken, as shown in step 204. This feature may help the user to choose from among, e.g., multiple found VINs. In one implementation, the browser extension 40 may visually depict the operation of searching for a harvesting the vehicle information being performed, as shown in step 206. This may be accomplished using animation or other visual technology to depict the vehicle information being taken from the webpage. This feature may help the user understand and be more comfortable with the process by visually depicting the performance of the process.

The user may be prompted to select at least one vehicle from among one or more vehicles for which vehicle information was found on the webpage, as shown in step 208. Additionally or alternatively, step 208 may include allowing the user to select a vehicle from a list of vehicles if more than one vehicle is found in the webpage or website scanned or searched.

In one implementation, the user may be allowed to select a "cancel" icon or otherwise similarly indicate a desire not to proceed and thereby close the browser extension 40 without obtaining a rate quote, and may be allowed to select an "okay" icon or otherwise indicate a desire to proceed with obtaining a rate quote, as shown in step 210.

The browser extension 40 may automatically pass the vehicle information for the selected vehicle(s) to the program application 42 in order to continue the insurance rate quote flow, as shown in step 212. In one implementation, this may be accomplished by storing the vehicle information in a location (e.g., in the memory element 32) which is accessible to both the browser 40 extension and the program application 42, as shown in step 214. In another implementation, the vehicle information may be passed to an intermediate program (e.g., a completion JAVASCRIPT® function), encoded, and used to format messages or passed to the program application 42 when the browser extension 40 is closed and the program application 42 is launched, as shown in step 216. The intermediate program may display a dialogue box allowing the user to choose to close the browser extension 40 and launch the program application 42 or to remain in the browser extension 40 and store the vehicle information for a future time when the user wishes to launch the program application 42.

The program application 42 may obtain user information useful or necessary for generating the insurance rate quote, as shown in step 218, and this user information may be used to pre-populating one or more fields in the program application 42. The user information may include the user's name, age, address, and/or number of miles driven in a particular time period (e.g., per year). If the user is already a customer of the insurance provider 22, and is logged in, the user information may be obtained from the database 28 of customer information, as shown in step 220. Furthermore, if the user is already a customer of the insurance provider 22, the program application 42 may ask the user whether the vehicle for which the insurance rate quote is desired is to be added to any vehicles the user already owns or whether the vehicle is to replace a vehicle the user already owns, and, if the latter, the program application 42 may prompt the user to select the existing vehicle which is to be replaced, as shown in step 222. If the user is not already an existing customer of the insurance provider 22, then the user may be prompted to provide the user information, as shown in step 224.

In one implementation, the program application 42 may save some or all of the information provided to it, as shown in step 226. This feature may be useful in situations in which the user is not already a customer of the insurance provider 22 and so may otherwise have to provide user or other information useful or necessary to generate the insurance rate quote after every new launch of the program application 42.

Based upon the vehicle information and the user information, the program application 42 may generate the insurance rate quote and present it on the display 38 of the mobile device, as shown in step 228. If insurance rate quotes are desired for multiple vehicles, an insurance rate quote may be provided for one vehicle at a time, or, alternatively, multiple insurance quotes may be provided for multiple vehicles substantially simultaneously to facilitate comparison.

In one implementation, the user may be allowed during this process to select a "help" icon or otherwise similarly indicate a desire to receive assistance in using the browser extension 40 and/or program application 42 and thereby cause a help window to open in order to provide such assistance.

In one embodiment, the user may be offered a loan for the price of the vehicle for which an insurance rate quote is being sought or otherwise offered vehicle financing, as shown in step 230. This may be accomplished by configuring the browser extension 40 to pass the same, additional, or other information to the same or a different program application that may return a loan rate quote and/or other loan terms.

In one embodiment, the user may be offered an extended warranty plan for the vehicle for which an insurance rate quote is being sought, as shown in step 232. This may be accomplished by configuring the browser extension 40 to pass the same, additional, or other information to the same or a different program application that may return an extended warranty rate quote and/or other warranty terms.

Other embodiments may be similarly configured to additionally or alternatively provide insurance rate quotes for substantially any type of real or personal property. For example, a vehicle insurance rate quote may be provided for substantially any type of vehicle (e.g., cars, trucks, motorcycles, boats, airplanes, personal watercraft, ATVs, riding lawnmowers, recreational vehicles, etc.); a home owners or renters insurance rate quote for a house or apartment, in which case the identifying information may include an MLS number, a street address, a set of GPS coordinates, and/or other information (e.g., square footage, roof type, year built, location, special features, etc.) taken from a webpage; and/or a personal article insurance rate quote for substantially any type of personal item (e.g., jewelry, artwork), in which case the identifying information may include the nature of the personal property and/or the value of the personal property taken from a web site.

The computer-implemented method may include additional, fewer, or alternative features, including those discussed elsewhere herein.

III. Exemplary Computer-Readable Medium

Referring again to FIGS. 2 and 10, a non-transitory computer-readable medium with an executable program stored thereon may be provided for facilitating a user of a mobile device 26 obtaining an insurance rate quote for a vehicle from an insurance provider 22. Vehicle information identifying the vehicle may be provided on a webpage. The browser extension 40 may search the webpage for the vehicle information identifying the vehicle, as shown in step 200. The user may be prompted to select the vehicle for which the insurance rate quote is desired from a list of one or more vehicles for which vehicle information identifying the one or more vehicles is found on the webpage, as shown in step 208. The vehicle information may automatically be passed from the browser extension to a program application 42, as shown in step 212. User information may be obtained for generating the insurance rate quote, as shown in step 218. Based upon the vehicle information and the user information, the insurance rate quote for the vehicle may be generated and displayed for the user, as shown in 228.

The non-transitory computer-readable medium may include additional, fewer, or alternative components or actions, including those discussed elsewhere herein, and particularly the additional features discussed in the section describing the computer-implemented method.

IV. Exemplary Browser Extension Functionality

Some of the present embodiments may provide a iOS browser extension that may (1) scan a webpage for vehicle information (e.g., a VIN number); (2) allow the user to select detected vehicles to get an auto insurance quote; and/or (3) pass the vehicle information to the insurance quoting flow (i.e., the user does not have to re-enter information). The user may download the browser extension to their mobile device and/or enable the browser extension via certain interactions with the mobile device display. The user may also select the browser extension, in some embodiments, to launch it.

The present browser extension may allow a customer to easily get an auto insurance quote from any webpage. A webpage may be scanned for Vehicle Identification (VIN) Numbers. This portion of an API or application may run as a modal window inside Mobile Safari, for example. All VINs found may be listed and the user may tap any of them to proceed to getting an auto insurance quote (quote for vehicle financing, for instance). Because the extension does this, the quote itself may actually be generated outside the extension in the associated "full application" (for example, Pocket Agent®).

The VIN scanning may comprise a JAVASCRIPT® function that uses regular expression patterns to detect VIN numbers in the web page content. Once those are identified, they may be presented to the customer. Selecting one may open a native application, which may then use the VIN to pre-populate that portion of a quote (or an online quote webpage). Additional information may also be pre-populated if the user was an existing customer and logged in. In this scenario, the only information a customer would need to provide is the car they are replacing.

When showing the VIN numbers, the application may show the customer where on the webpage each VIN was harvested from (such as in order to help them choose from multiple VIN numbers appearing on the same page). Additionally, graphical enhancement showing the numbers being harvested off the webpage may help provide the user some intuitive context about the operations that are being performed. Both of these may require careful timings with animations and asynchronous fetch operations.

In one embodiment, the browser extension may be used on a webpage displaying a vehicle, such as a dealership website. VIN numbers may be scanned, but also any identifying information may be scanned and used. Additionally, other products in addition to auto insurance may also be quoted using this same technique of harvesting data from a web page. These may include (but are not limited to): homeowners insurance (such as by scanning and using street address, GPS, home feature, and/or other information); renters insurance (such as by scanning and using address, GPS, apartment or condo feature, and/or other information; and/or personal articles insurance (such as by scanning and using object, feature, value, and/or other information).

The iOS extension may ship with a containing application. This may be an existing application, such as State Farm's Pocket Agent® mobile app, or a new application tailored to this user experience. In either case, the user must first enable the extension before using it (not shown). Once they have done that, they may be able to select it from the iOS "share sheet", which is shown by tapping the button in the bottom middle of the screen that looks like a box with an arrow coming out of the top. Once the user performs the above two steps, the share sheet may be displayed showing the browser extension. Selecting the extension icon may launch it.

The extension may be a small native applet that runs in its own context (apart from both Safari and the app it shipped with). It first may run a JAVASCRIPT® function on the original page that harvests the relevant information. This data may then be returned to the extension. This data may be used to present the user with a list of items that they may get a quote for. Additionally or alternatively, all items may be quoted if desired.

Pressing a cancel icon may dismiss the extension with no action. Conversely, selecting an item may cause the data to be passed back to the full application in two ways (or both): (1) the data may be stored in a stored location both the extension and app may access (there may be a shared User Defaults area, as well as shared file system); and/or (2) the data may be passed to a completion JAVASCRIPT® function that runs on the Safari page. This data may be used to format messages or passed to the app when launching via URL by encoding it. In either case, selecting a vehicle may cause the extension to close and return the user to the browser.

There may be a "completion" JAVASCRIPT® function that may be specified when the extension closes that can be passed the vehicle information. Some embodiments may use this data to display a confirmation dialog. Clicking an OK icon may launch the full app, while clicking a cancel icon will leave the user in the browser (with the saved vehicle information stored so they may quote the next time they open the application, such as an insurance provider application). The app may be launched without the prompt if desired.

In some embodiments, the native application may open and receive the vehicle information (either by being passed it via URL or by reading in off disk). At this point, this vehicle information may be used to supply the quoting process with that portion of the necessary information. In one scenario, the user is an existing insurance customer who wishes to replace an existing vehicle. The customer may virtually choose that action and the vehicle being replaced, such as via their mobile device, in order to receive a quote. Other quoting flows may be more detailed, and the more complicated flows may save data between runs to avoid requiring data re-entry. The browser extension may include additional, less, or alternate functionality, including that discussed elsewhere herein.

V. Exemplary Auto Insurance Quote Generation

A computer-implemented method may be provided for facilitating a user of a mobile device obtaining an insurance rate quote for a vehicle from an insurance provider. Vehicle information identifying the vehicle may be provided on a webpage.

In one aspect, the method may include (1) using a browser extension to search or otherwise scan the webpage for the vehicle information identifying the vehicle; (2) automatically passing the vehicle information for which the insurance rate quote is desired from the browser extension to a program application; (3) obtaining user information for generating an insurance rate quote; and/or (4) generating based, at least in part, upon the vehicle information and/or the user information, and displaying for the user the insurance rate quote for the vehicle to facilitate providing an insurance product to the user.

In another aspect, the method may include (1) using a browser extension, via one or more processors (such as a processor of a customer mobile device), to search or otherwise scan the webpage for the vehicle information identifying the vehicle; (2) automatically passing, via the one or more processors, the vehicle information for which the insurance rate quote is desired from the browser extension to a program application; (3) transmitting the vehicle information, via wireless communication or data transmission, from the one or more processors (or associated transceiver) to an insurance provider remote server or website; (4) receiving an auto insurance quote, via the one or more processors (or associated transceiver), based upon, at least in part, the vehicle information; and/or (5) displaying, via the one or more processors, the auto insurance rate quote for the vehicle on a display screen of the customer mobile device to facilitate providing or selling an insurance product to the user.

In another aspect, the method may include (1) using a browser extension, via one or more processors (such as a processor of a customer mobile device), to search or otherwise scan the webpage for the vehicle information identifying the vehicle; (2) automatically passing or otherwise sending, via the one or more processors, the vehicle information scanned from the webpage for which the insurance rate quote is desired from the browser extension to a program application, such as a program application running or stored on the mobile device; (3) transmitting the vehicle information (along with customer information), via wireless communication or data transmission, from the one or more processors (or associated transceiver) to an insurance provider remote server or website; (4) receiving, via the one or more processors (or associated transceiver), an auto insurance quote based upon, at least in part, the vehicle information (and/or the customer information) from the insurance provider remote server or web site; and/or (5) displaying, via the one or more processors, for the user the insurance rate quote for the vehicle on a display screen of the mobile device to facilitate providing or selling an insurance product to the user.

The methods may include additional, less, or alternate actions, including those discussed elsewhere herein. The methods may be implemented via one or more local or remote processors or servers, such as processors associated with mobile devices or third party remote processors/servers. The methods may be implemented via computer-executable instructions stored on non-transitory computer-readable medium or media.

VI. Exemplary Quote or Pricing Generation Using Web Info

In one aspect, a computer-implemented method may be provided for facilitating a user of a mobile device obtaining further or additional information associated with a vehicle from a third party. Vehicle information identifying the vehicle may be provided on a webpage.

The method may include: (1) using a browser extension to search or otherwise scan the webpage for the vehicle information identifying the vehicle, such as under the direction or control of a processor associated with the mobile device; (2) automatically passing or sending, via the processor, the vehicle information for which further information associated with the vehicle is desired from the browser extension to a program application, such as a program application stored or running on the mobile device; and/or (3) transmitting the vehicle information (along with customer information), via wireless communication or data transmission, from or via the processor (or associated transceiver) to an insurance provider, vehicle dealership, bank, or other third party remote server or website; (4) receiving, via the processor (or associated transceiver), the further information sought based upon, at least in part, the vehicle information (and/or the customer information) from the third party remote server or website; and/or (5) displaying, via the processor, for the user on a mobile device display the further information sought that is generated based upon, at least in part, the vehicle information to facilitate providing a product or service to the user, the further information associated with the vehicle being (i) an auto insurance quote, (ii) a quote of a purchase price of a vehicle, (iii) an auto loan or financing quote or terms, or (iv) a rental vehicle quote.

The method may include (1) using a browser extension to search or otherwise scan the webpage for the vehicle information identifying the vehicle, such as under the direction or control of a processor associated with the mobile device; (2) automatically passing or sending, via the processor, the vehicle information for which a purchase price quote for the vehicle is desired (such as a receiving an offer for purchase from one or more vehicle dealerships) from the browser extension to a program application, such as a program application stored or running on the mobile device; (3) transmitting the vehicle information (along with customer information), via wireless communication or data transmission, from or via the processor (or associated transceiver) to a third party remote server or website; (4) receiving, via the processor (or associated transceiver), the purchase price quote sought based upon, at least in part, the vehicle information (and/or the customer information) from the third party remote server or web site; and/or (5) displaying, via the processor, for the user on a mobile device display the purchase price quote sought that is generated based upon, at least in part, the vehicle information (and/or the customer information) to facilitate providing a product or service to the user.

The method may include (1) using a browser extension to search or otherwise scan the webpage for the vehicle information identifying the vehicle, such as under the direction or control of a processor associated with the mobile device; (2) automatically passing or sending, via the processor, the vehicle information for which an auto loan or financing quote for the vehicle is desired (such as receiving loan offers from a vehicle dealership or bank) from the browser extension to a program application, such as a program application stored or running on the mobile device; (3) transmitting the vehicle information (along with customer information), via wireless communication or data transmission, from or via the processor (or associated transceiver) to a third party remote server or website; (4) receiving, via the processor (or associated transceiver), the auto loan or financing quote sought based upon, at least in part, the vehicle information (and/or the customer information) from the third party remote server or web site; and/or (5) displaying, via the processor, for the user on a mobile device display the auto loan or financing quote that is generated based upon, at least in part, the vehicle information to facilitate providing a product or service to the user.

The method may include (1) using a browser extension to search or otherwise scan the webpage for the vehicle information identifying the vehicle, such as under the direction or control of a processor associated with the mobile device; (2) automatically passing or sending, via the processor, the vehicle information for which a rental rate quote for the vehicle is desired (such as a receiving daily rental rate from one or more rental car companies) from the browser extension to a program application, such as a program application stored or running on the mobile device; (3) transmitting the vehicle information (along with customer information), via wireless communication or data transmission, from or via the processor (or associated transceiver) to a third party remote server or web site (such as a rental car company remote server or web site); (4) receiving, via the processor (or associated transceiver), the rental rate quote sought based upon, at least in part, the vehicle information (and/or the customer information) from the third party remote server or website; and/or (5) displaying, via the processor, for the user on a mobile device display the rental rate quote that is generated based upon, at least in part, the vehicle information to facilitate providing a product or service to the user.

The methods may include additional, less, or alternate actions, including those discussed elsewhere herein. The methods may be implemented via one or more local or remote processors or servers, such as processors associated with mobile devices or third party remote processors/servers. The methods may be implemented via computer-executable instructions stored on non-transitory computer-readable medium or media.

VII. Exemplary Property Insurance or Financing Applications

In one aspect, a computer-implemented method may be provided for facilitating a user of a mobile device obtaining an insurance quote for a house or apartment (or other real property) from an insurance provider. Property information identifying the features of, or otherwise associated with, the house or apartment may be provided on a webpage or website. The method may include (1) using a browser extension, via one or more processors (such as a processor of a customer mobile device), to search or otherwise scan the webpage or website for the property information identifying the features of, or otherwise associated with, the house or apartment; (2) automatically passing or otherwise sending, via the one or more processors, the property information scanned from the webpage associated with the property for which the insurance quote is desired from the browser extension to a program application, such as a program application running or stored on the mobile device; (3) transmitting the property information (along with customer information), via wireless communication or data transmission, from the one or more processors (or associated transceiver) to an insurance provider remote server or website; (4) receiving, via the one or more processors (or associated transceiver), a homeowners or renters insurance quote based upon, at least in part, the property information scanned from the webpage (and/or the customer information) from the insurance provider remote server or website; and/or (5) displaying, via the one or more processors, for the user the insurance quote for the homeowners or renters insurance policy on a display screen of the mobile device to facilitate providing or selling an insurance product to the user.

In another aspect, a computer-implemented method may be provided for facilitating a user of a mobile device obtaining an insurance quote for one or more personal belongings from an insurance provider. Property information identifying the features of, or otherwise associated with, the one or more personal belongings may be provided on a webpage or website. The method may include (1) using a browser extension, via one or more processors (such as a processor of a customer mobile device), to search or otherwise scan the webpage for the property information identifying the features of, or otherwise associated with, the personal belonging(s); (2) automatically passing or otherwise sending, via the one or more processors, the property information scanned from the webpage associated with the personal belongings for which the insurance quote is desired from the browser extension to a program application, such as a program application running or stored on the mobile device; (3) transmitting the property information (along with customer information), via wireless communication or data transmission, from the one or more processors (or associated transceiver) to an insurance provider remote server or website; (4) receiving, via the one or more processors (or associated transceiver), a personal articles insurance quote based upon, at least in part, the property information scanned from the webpage or website (and/or the customer information) from the insurance provider remote server or website; and/or (5) displaying, via the one or more processors, for the user the insurance quote for the personal articles insurance policy on a display screen of the mobile device to facilitate providing or selling an insurance product to the user.

In another aspect, a computer-implemented method may be provided for facilitating a user of a mobile device obtaining a loan offer or financing quote for a house (or other real property) from an financial services provider. Property information identifying the features of, or otherwise associated with, the house or other property may be provided on a webpage or website. The method may include (1) using a browser extension, via one or more processors (such as a processor of a customer mobile device), to search or otherwise scan the webpage or website for the property information identifying the features of, or otherwise associated with, the house or other property; (2) automatically passing or otherwise sending, via the one or more processors, the property information scanned from the webpage associated with the house or other property for which the loan offer or financing quote is desired from the browser extension to a program application, such as a program application running or stored on the mobile device; (3) transmitting the property information (along with customer information), via wireless communication or data transmission, from the one or more processors (or associated transceiver) to a financial services provider remote server or website; (4) receiving, via the one or more processors (or associated transceiver), a loan offer or financing quote (e.g., amount of loan, interest rate, monthly payment, etc.) based upon, at least in part, the property information scanned from the webpage (and/or the customer information) from the financial services provider remote server or website; and/or (5) displaying, via the one or more processors, for the user the loan offer or financing quote on a display screen of the mobile device to facilitate providing a loan or financing to the user.

The methods mentioned directly above may include additional, less, or alternate actions, including those discussed elsewhere herein. The methods may be implemented via one or more local or remote processors or servers, such as processors associated with mobile devices or third party remote processors/servers. The methods may be implemented via computer-executable instructions stored on non-transitory computer-readable medium or media.

VIII. Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity or group of tangible entities, be that entities that are physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time. Moreover, the "processing element" may, unless more narrowly described, consist of multiple separate tangible pieces of hardware for operating in the described manner to perform certain operations described herein.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although embodiments of the present inventive concept have been described with reference to the illustrations in the attached drawing figures, it is noted that equivalents may be employed and substitutions made herein without departing from the scope of the present inventive concept as recited in the claims. Having thus described various embodiments of the present inventive concept, what is claimed as new and desired to be protected by Letters Patent includes the following:

I claim:

1. A computer-implemented method comprising:
   receiving from a user a request to start a browser extension on a user selected webpage displayed on a browser application of a mobile device, the request being initiated by the user via user input in the form of user selection of a browser extension icon;
   starting the browser extension in response to receiving the user input;
   scanning the webpage, using the browser extension running on the mobile device, for vehicle information identifying one or more vehicles;
   generating a list of the vehicle information detected on the webpage by the browser extension;
   prompting the user to select at least one vehicle of the one or more vehicles identified by the vehicle information from the list of the detected vehicle information;
   in response to receiving a user selection of at least one vehicle, automatically passing the vehicle information associated with the selected at least one vehicle from the browser extension to a program application running on the mobile device that is different from the browser application;
   using the program application, obtaining user information corresponding to the user;
   transmitting the user information and the vehicle information associated with the selected at least one vehicle to a remote server of an insurance provider; and
   receiving at the program application, from the remote server, a response message based upon the user information and the vehicle information associated with the selected at least one vehicle.

2. The computer-implemented method of claim 1, wherein the selected at least one vehicle is selected from the group consisting of: cars, trucks, motorcycles, boats, airplanes, personal watercraft, all-terrain vehicles, riding lawnmowers, and recreational vehicles.

3. The computer-implemented method of claim 1, wherein the vehicle information is selected from the group consisting of: vehicle identification numbers, makes, models, manufacturing years, colors, engines, and conditions.

4. The computer-implemented method of claim 1, wherein the webpage is selected from the group consisting of: vehicle dealers' webpage, online marketplace webpages, online bulletin board webpages, and newspaper online classified webpages.

5. The computer-implemented method of claim 1, further including allowing the user to indicate a portion of the webpage in which the vehicle information is found, and limiting the search for the vehicle information to the indicated portion of the webpage.

6. The computer-implemented method of claim 1, further including indicating for the user where on the webpage the vehicle information was found.

7. The computer-implemented method of claim 6, further including visually depicting the browser extension searching the webpage for the vehicle information.

8. The computer-implemented method of claim 1, further including, prior to passing the vehicle information to the program application, prompting the user to discontinue the process and close the browser extension, or to continue the process and pass the vehicle information to the program application.

9. The computer-implemented method of claim 1, wherein passing the vehicle information to the program application includes automatically populating one or more fields in the program application.

10. The computer-implemented method of claim 1, wherein passing the vehicle information to the program application includes storing the vehicle information in an electronic memory location which is accessible to both the browser extension and the program application.

11. The computer-implemented method of claim 1, wherein passing the vehicle information to the program application includes passing the vehicle information to an intermediate program, closing the browser extension, and passing the vehicle information from the intermediate program to the program application.

12. The computer-implemented method as set forth m claim 1, wherein obtaining user information includes—
   if the user is an existing customer of the insurance provider, retrieving the user information from the remote server; and
   if the user is not an existing customer of the insurance provider, prompting the user to provide the user information, wherein the user information is selected from the group consisting of: names, ages, addresses, and numbers of driving miles in a particular time period.

13. The computer-implemented method of claim 12, further including saving the user information for future use by the browser extension or program application.

14. The computer-implemented method of claim 12, further including if the user is an existing customer of the insurance provider—
prompting the user to indicate whether the selected at least one vehicle will replace an existing vehicle insured by the user, and—
if so, listing one or more existing vehicles insured by the user and prompting the user to select a vehicle from the one or more existing vehicles to be replaced, and
if not, prompting the user to provide an approximate number of miles that the selected at least one vehicle will be driven in a particular time period.

15. The computer-implemented method of claim 1, wherein if the user selects a plurality of vehicles of the one or more vehicles identified by the vehicle information for each of which an insurance rate quote is desired, further including displaying a plurality of insurance rate quotes simultaneously to facilitate a comparison of the cost of insuring each vehicle, the response message including the plurality of rate quotes.

16. The computer-implemented method of claim 1, further including presenting to the user an offer to finance the user's acquisition of the selected at least one vehicle, and, if the user accepts the offer, passing the vehicle information and the user information to the same or another program application that generates and displays for the user an interest rate quote.

17. The computer-implemented method of claim 1, further including presenting to the user an offer to provide an extended warranty on the selected at least one vehicle, and, if the user accepts the offer, passing the vehicle information and the user information to the same or another program application that generates and displays for the user an extended warranty price quote.

18. A computer-implemented method comprising:
scanning a user selected webpage displayed on a browser application of a mobile device, using a browser extension running on the mobile device, for property information identifying one or more properties;
generating a list of the property information detected on the webpage by the browser extension;
prompting a user to select a property of the one or more properties from the list of the detected property information;
in response to receiving a user selection of at least one property, automatically passing the property information associated with the selected property from the browser extension to a program application running on the mobile device that is different from the browser application;
transmitting the property information associated with the selected property to a remote server of insurance provider; and
displaying for the user a response message received from the remote server.

19. A computer system comprising:
a communication element configured to receive and transmit communications via a network;
a memory configured to store information;
a display configured to display information to a user; and
one or more processors electronically coupled to the communication element and the memory element and configured to perform the following:
receiving from the user a request to start a browser extension on a user selected webpage displayed on a browser application and presented on the display, the request being initiated by the user via user input in the form of user selection of a browser extension icon;
starting the browser extension in response to receiving the user input;
scanning the webpage, using the browser extension, for vehicle information identifying one or more vehicles;
generating a list of the vehicle information detected on the webpage by the browser extension;
in response to receiving a user selection of at least one vehicle, prompting the user to select a vehicle of the one or more vehicles identified by the vehicle information from the list of the detected vehicle information;
automatically passing the vehicle information associated with the selected vehicle from the browser extension to a program application, which is different from the browser application;
using the program application, obtaining user information corresponding to the user;
transmitting the user information and the vehicle information associated with the selected at least one vehicle to a remote server of an insurance provider;
receiving at the program application, from the remote server, a response message based upon the user information and the vehicle information associated with the selected at least one vehicle; and
presenting on the display the response message.

20. The computer system of claim 19, wherein the selected vehicle is selected from the group consisting of: cars, trucks, motorcycles, boats, airplanes, personal watercraft, all-terrain vehicles, riding lawnmowers, and recreational vehicles.

* * * * *